United States Patent Office 3,456,424
Patented July 22, 1969

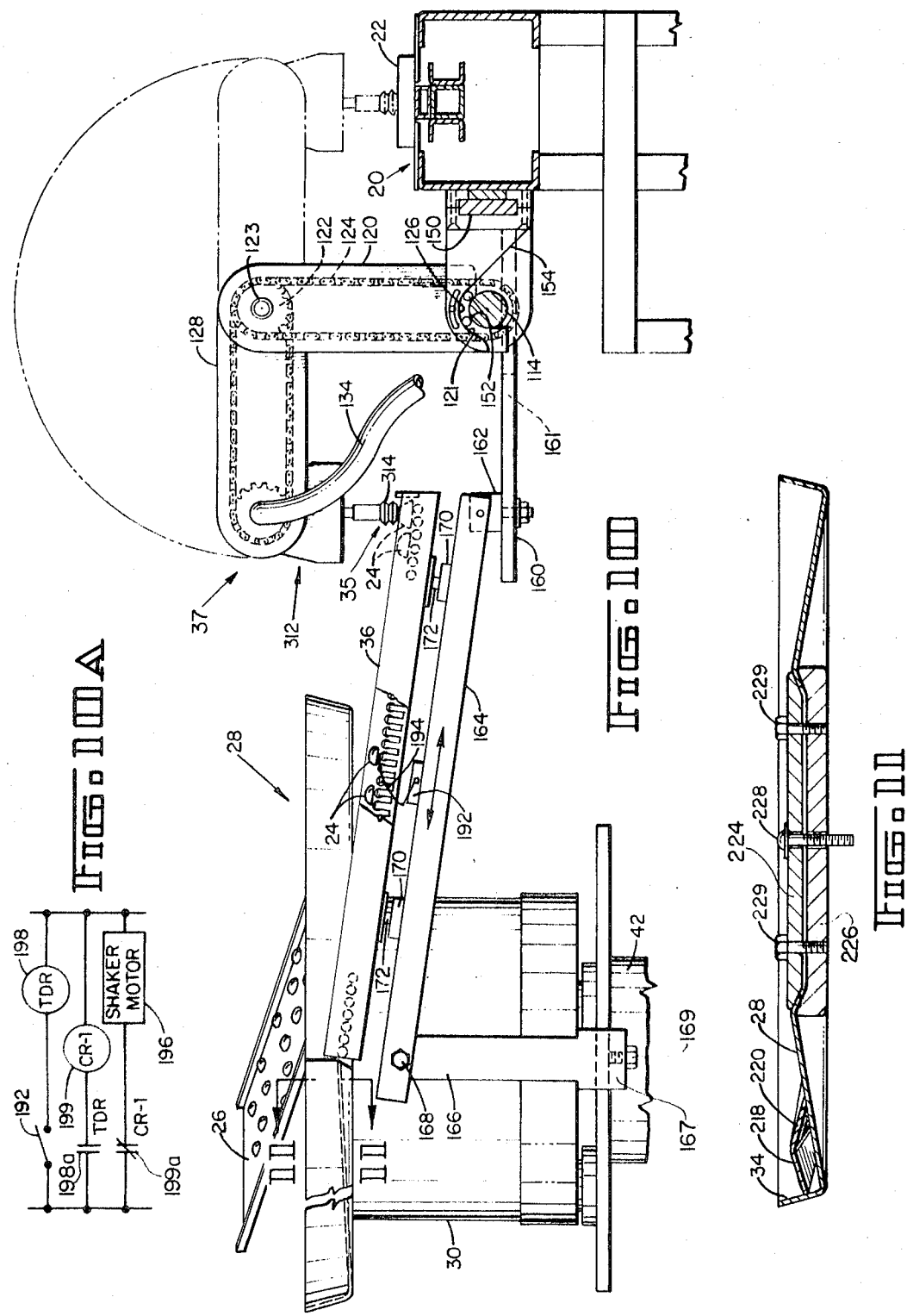

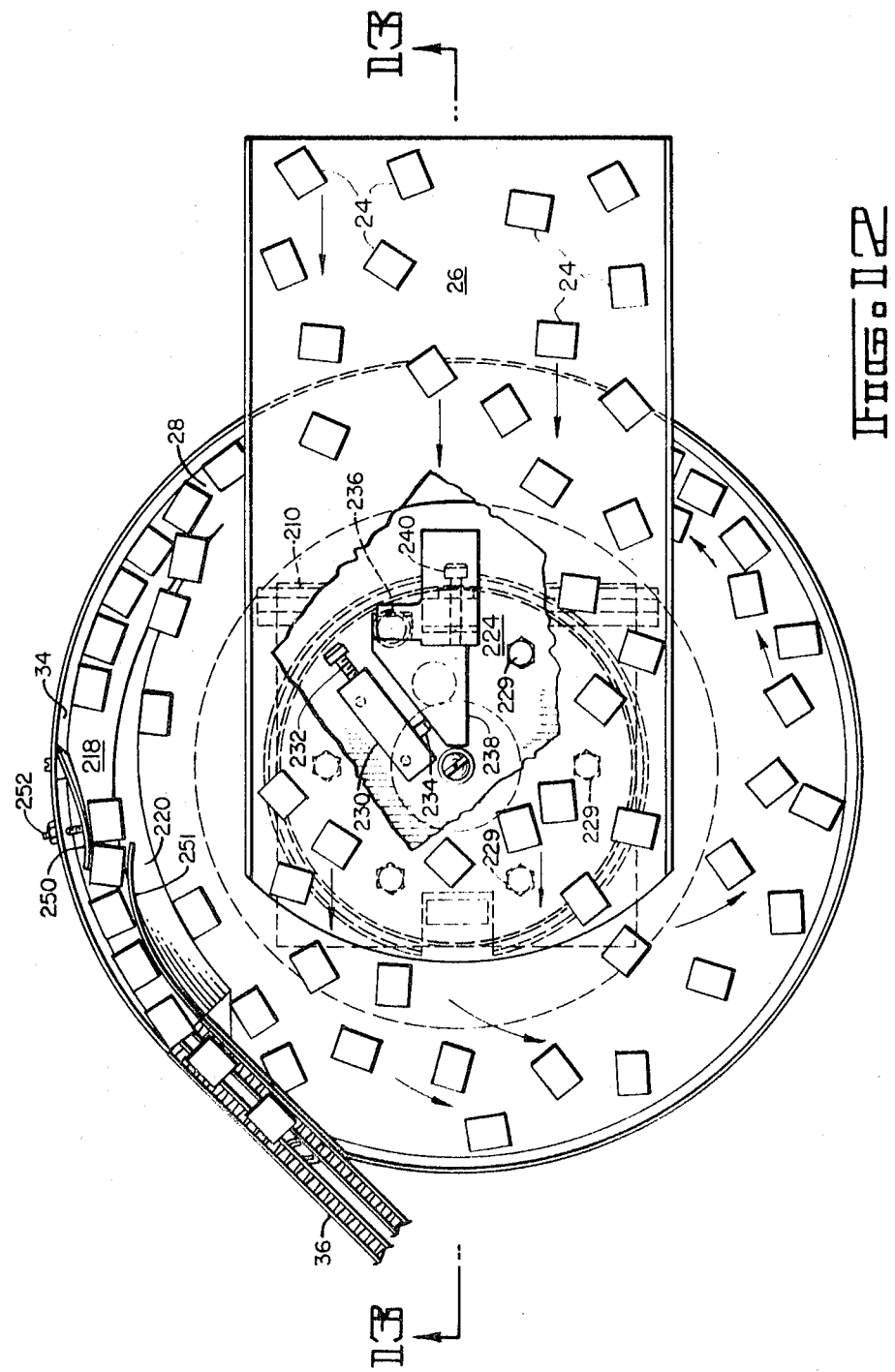

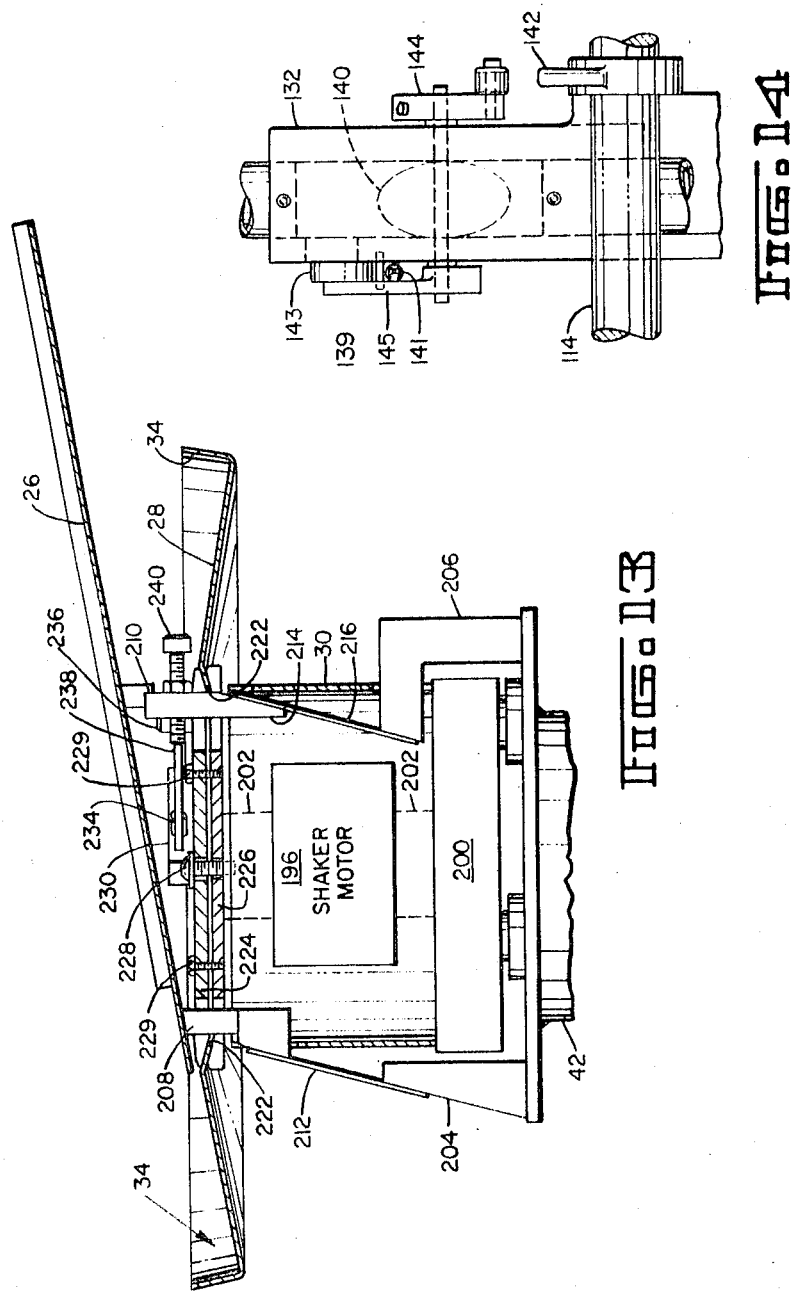

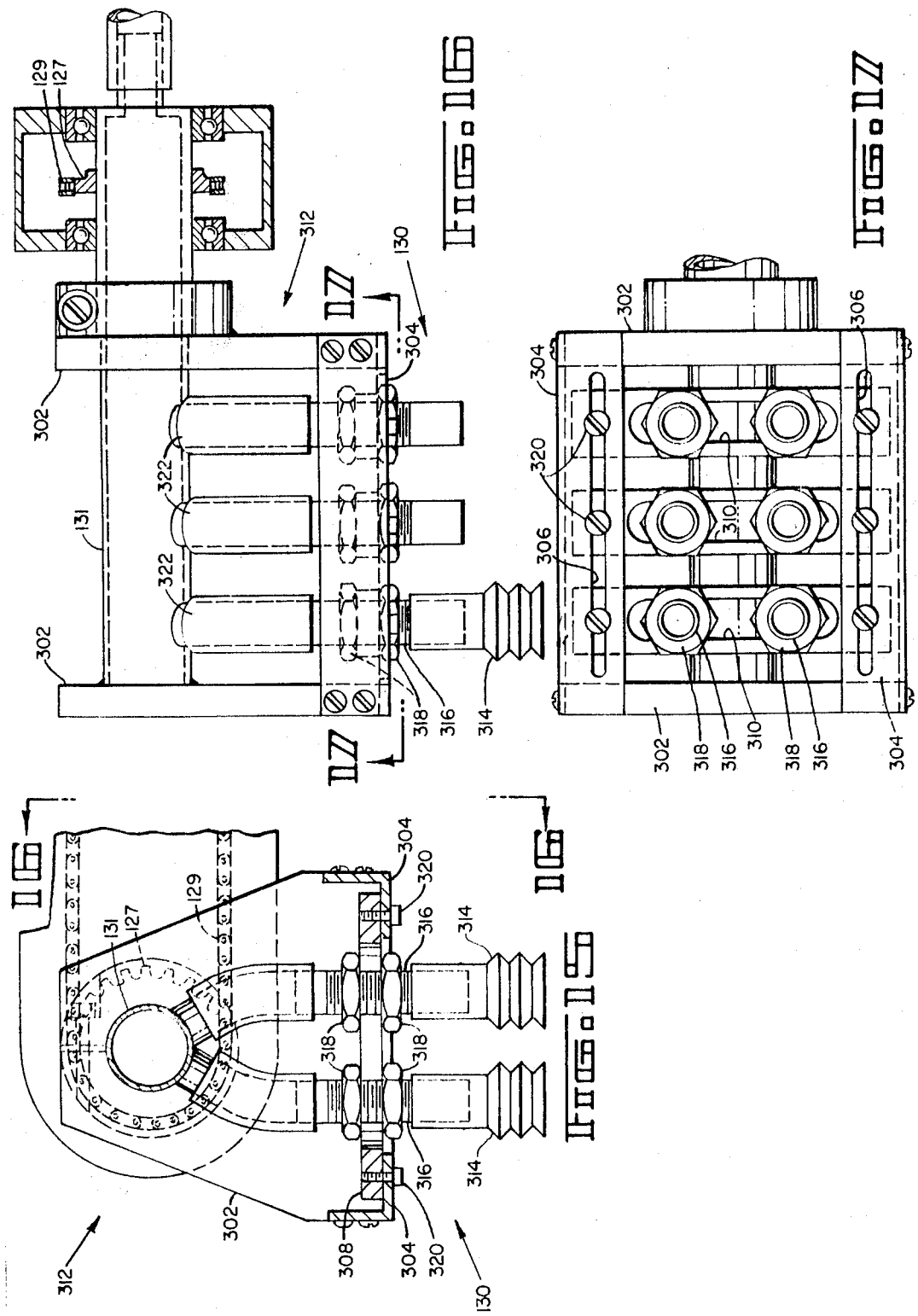

3,456,424
ARTICLE PACKAGING OR HANDLING
APPARATUS
Franklin J. Thurston and Joseph M. Nazali, Hartford,
Conn., assignors to Kaman Aircraft Corporation,
Bloomfield, Conn., a corporation of Connecticut
Filed Nov. 18, 1966, Ser. No. 595,447
Int. Cl. B65b 35/54, 35/30, 35/50
U.S. Cl. 53—154                                26 Claims

ABSTRACT OF THE DISCLOSURE

A walking beam type conveyor moves boxes intermittently therealong, and candies are fed to loading stations alongside the conveyor where they are picked up by a vacuum operated transfer mechanism which moves in timed relationship with the conveyor. The candies are fed from a vibratory feeder bowl in oriented relationship so that irregular candies can be packed in preformed receptacles in the boxes.

---

This invention relates to machines for packaging articles, such as candies or the like, and deals more particularly with an apparatus which is capable of orienting articles of irregular shape and of transferring such articles into compartments of an open box or preformed tray.

In the description which follows the invention has been generally described as applied to a machine for packaging candies. This has been done primarily for convenience and in view of the fact that the invention is particularly well suited to this use. It should be understood, however, that there is no intention to so limit the invention, and that it may well be used for handling articles other than candies. Apparatus embodying various aspects of the invention also need not necessarily be used strictly for packaging articles and could, for example, be used for orienting and transferring articles in an automatic assembly system.

A general object of the present invention is to provide an article packaging or handling apparatus capable of automatically handling relatively large batches of articles of various size, of orienting such articles, and of feeding said articles individually to designated locations, such as into the compartments of a box or tray, according to a particular predetermined pattern.

A further object of the present invention is to provide an article packaging or handling apparatus which is flexible as to the type of candies or other articles handled and as to the arrangement in which such articles are deposited in their end locations, the apparatus being made up of a plurality of similar components capable of being arranged in a wide variety of different configurations.

A further object of the present invention is to provide an article packaging or handling apparatus especially well suited to handling fragile or soft articles, such as candies or confection, without damage.

A more specific object of the present invention is to provide an article packaging or handling apparatus including a plurality of vibratory feeder bowls each of which is fed batches of articles by an associated vibrating tray directly driven by the same motor as the vibratory feeder bowl.

A more specific object of the present invention is to provide an article packaging or handling apparatus including a novel and versatile conveyor for intermittently feeding boxes, trays or other receptacles through the apparatus in timed relation with the movement of articles onto said receptacles.

Other objects and advantages will be apparent from the following description and from the drawings forming a part hereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

FIG. 10 is an elevational view showing one feeder bowl together with its associated tray and inclined chute, and also shows a transfer mechanism for lifting the lowermost article from the chute and depositing the same in a box or tray on the walking beam conveyor, the transfer mechanism being shown in position for picking up such an article in solid lines and for depositing the article in the box in broken lines.

FIG. 10A is a schematic electrical diagram of the circuit operated by the switch shown in FIG. 10.

FIG. 11 is a sectional view taken along the line 11—11 of FIG. 10.

FIG. 12 is a plan view of a tray, a feeder bowl, and a portion of the inclined chute with portions of the tray and bowl being broken away to reveal mechanism for vibrating the tray linearly in response to rotational vibrations of the bowl.

FIG. 13 is a vertical sectional view taken along the line 13—13 of FIG. 12.

Figure 3:
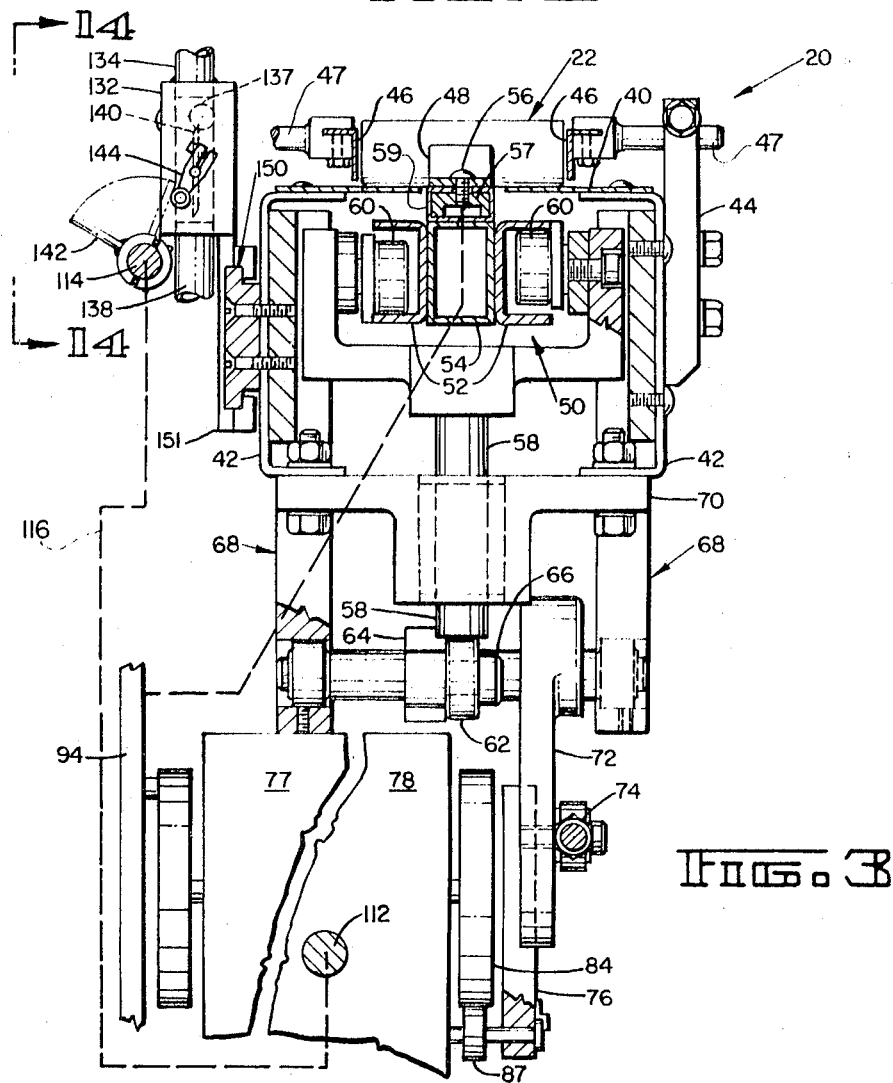
FIG. 3 is an enlarged vertical sectional view taken along the line 3—3 of FIG. 1 showing the walking beam conveyor and a valve block for operation of one of several article transfer means associated therewith.

FIG. 14 is a side view of the valve assembly shown in FIG. 3, and is taken along the line 14—14 of that figure.

FIG. 15 is an enlarged detailed view of a portion of the transfer mechanism depicted in FIG. 10.

FIG. 16 is a vertical sectional view taken along the line 16—16 of FIG. 15.

FIG. 17 is horizontal sectional view taken along the line 17—17 of FIG. 16.

Figure 1:
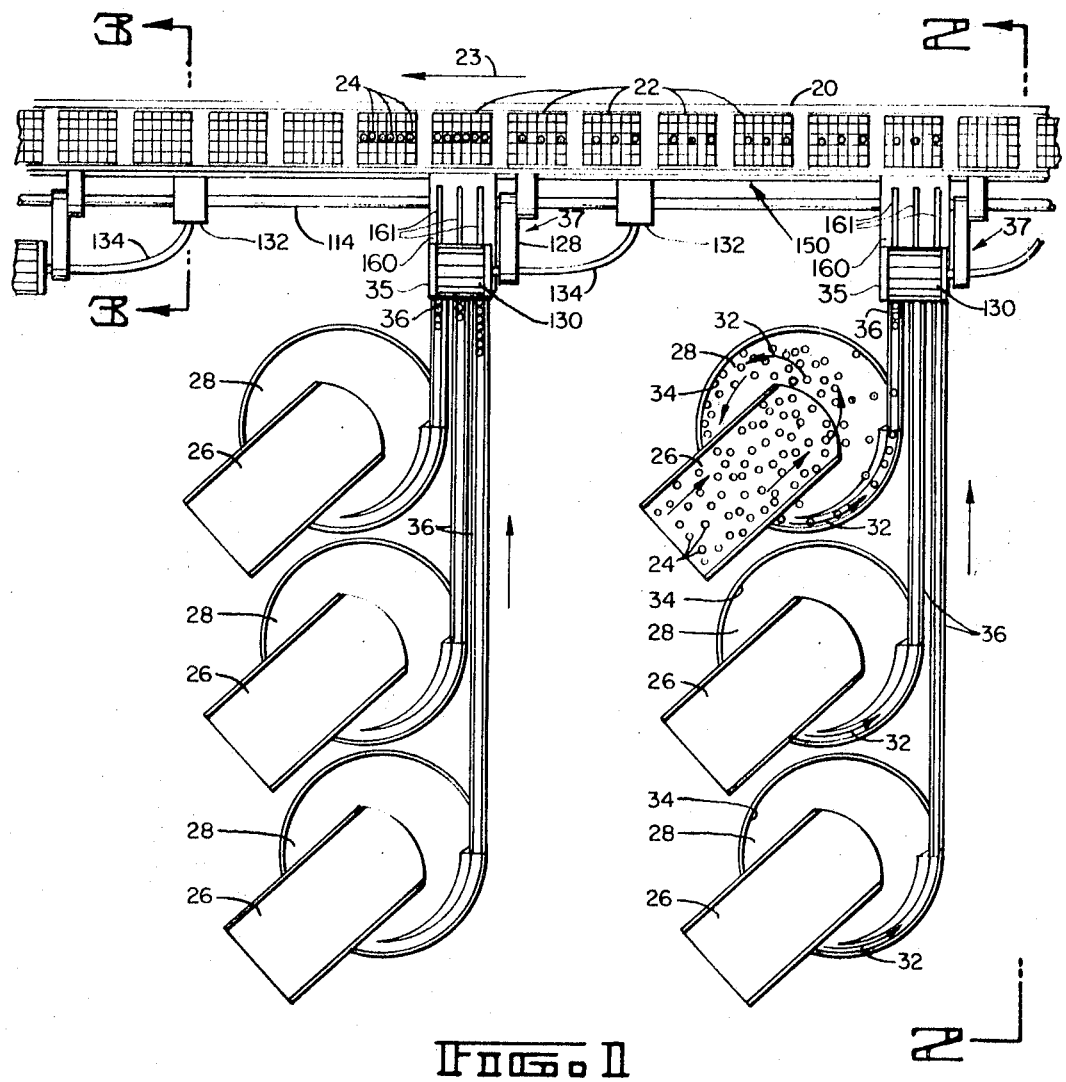
FIG. 1 is a plan view of a portion of an article packaging apparatus constructed in accordance with the present invention.

Turning now to the drawings in greater detail, FIG. 1 shows an article packaging apparatus of the present invention particularly well suited to depositing candies in upwardly open compartments of a preformed tray, box, or other similar receptacle. The illustrated apparatus includes a conveyor, indicated generally at 20, upon which a plurality of such receptacles are conveyed from right to left in an intermittent fashion, the direction of movement being indicated by the arrow 23. The conveyor 20 is shown in greater detail in FIGS. 3, 4, and 5, with reference to which said conveyor will be described in greater detail hereinbelow. In the present case the receptacles are shown to be boxes 22, 22, each of which includes a plurality of upwardly open cavities or compartments. These compartments may be all of the same general outline and arranged in a regular order, or may be of various different outlines and somewhat irregularly arranged. In either case, however, the shape and arrangement is the same from box to box. For simplicity, the compartments of the boxes 22, 22 shown in FIG. 1 are generally square in shape, of uniform size and are regularly arranged, the apparatus in turn being adapted to handle candies which are of a generally uniform size and shape. It will, of course, be apparent from the description to follow that it is within the scope of the present invention to adjust and rearrange various parts of the apparatus to allow its use for feeding candies of various shapes to corresponding loading stations, and for transferring such candies into particular compartments in preformed trays or boxes having a number of differently shaped and sized compartments to receive the same.

Figure 2:
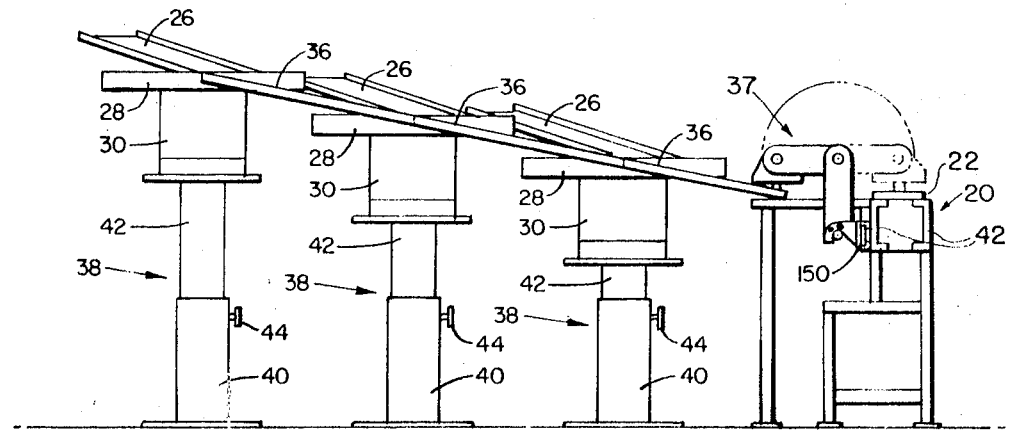
FIG. 2 is a side elevational view of the apparatus shown in FIG. 1 taken along the line 2—2 of that figure.

In the use of the illustrated apparatus, batches of candies 24, 24 to be packed are placed on loading trays 26, 26, with each tray receiving candies which are generally identical to one another. That is, candies of one kind or sort are loaded onto one tray 26 and candies of another kind or sort are or may be loaded onto another tray 26. It should also be understood that the candies are moved onto the trays from flats, by the operator, and rest on their bottom surfaces when received by the trays so that there is no problem of orienting the candies to turn up the proper side. Each tray is inclined, as shown in FIG. 2, and is vibrated linearly so as to feed the candies placed thereon into a sub-adjacent feeder bowl 28 at a controlled rate. Each of the feeder bowls 28, 28 is mounted on a generally conventional vibratory driving base or motor 30 which vibrates the associated feeder bowl 28 angularly about its vertical central axis in such a manner as to cause it to feed the candies around the bowl in the direction of the arrows 32, 32 of FIG. 1. The feeder bowls 28, 28 each have a generally convex or conical upper surface so that the candies 24, 24 move down such surface by gravity as they are vibrated, and in so moving move radially outwardly toward a peripheral fence 34. Each feeder bowl 28 has a chute 36 associated therewith for delivering candies from the feeder bowl to an associated loading station 35. Each chute is inclined, as shown in FIG. 2, and has an upper end for receiving candies from the feeder bowl through a gate in the bowl's peripheral fence 34. Article rejecting means are provided adjacent the gate to reject articles which are not properly oriented for entry into the chute 36.

The articles 24, 24 which do enter the chutes are gravity-fed thereby to the associated loading stations. At each of these loading stations the candies are successively picked up by an article transfer means 37 and are deposited in the proper compartments in boxes 22, 22. In FIG. 1 only a portion of the apparatus of the present invention is shown, enough trays, feeder bowls, and chutes being provided for loading six articles 24, 24 out of a total number of 30 required to fill each box 22. Additional components similar to those shown in FIG. 1 are located downstream of those shown to fill the other compartments of the boxes.

It is an important feature of the present invention that each feeder bowl 28 is mounted on a pedestal, or base, 38 which is adjustable in height to provide an optimum angle of inclination for the associated chute 36. Preferably and as shown in FIG. 2, each of the pedestals 38 comprises a base portion 40 and an upper portion 42 which is adjustably received therein and adapted to be locked at a particular height by a locking screw 44. The upper portion 42 carries the vibrating base or motor 30 of the associated feeder bowl 28.

The base portions of the pedestals may be fastened to the floor, but preferably are made relatively heavy so that they will remain in place due to their weight, and the weight of the other parts carried thereby, without the need for fasteners. This allows them to be readily moved from place to place to vary the configuration of the overall apparatus, if desired.

Feeder units, made up of feeder bowls, trays, and pedestals, may be added to the apparatus to pack more candies in each box, and such units may be removed, or not used, when packing fewer candies in a box. It will be apparent that such units could also be assembled on both sides of the conveyor 20, depending upon the space requirements of the particular installation and the number of candies to be packed in each box. If desired, suitable auxiliary means may also be provided for inserting conventional paper cups in the trays or boxes 22, 22 either upstream of the loading stations just described or at each such loading station.

Figure 4:
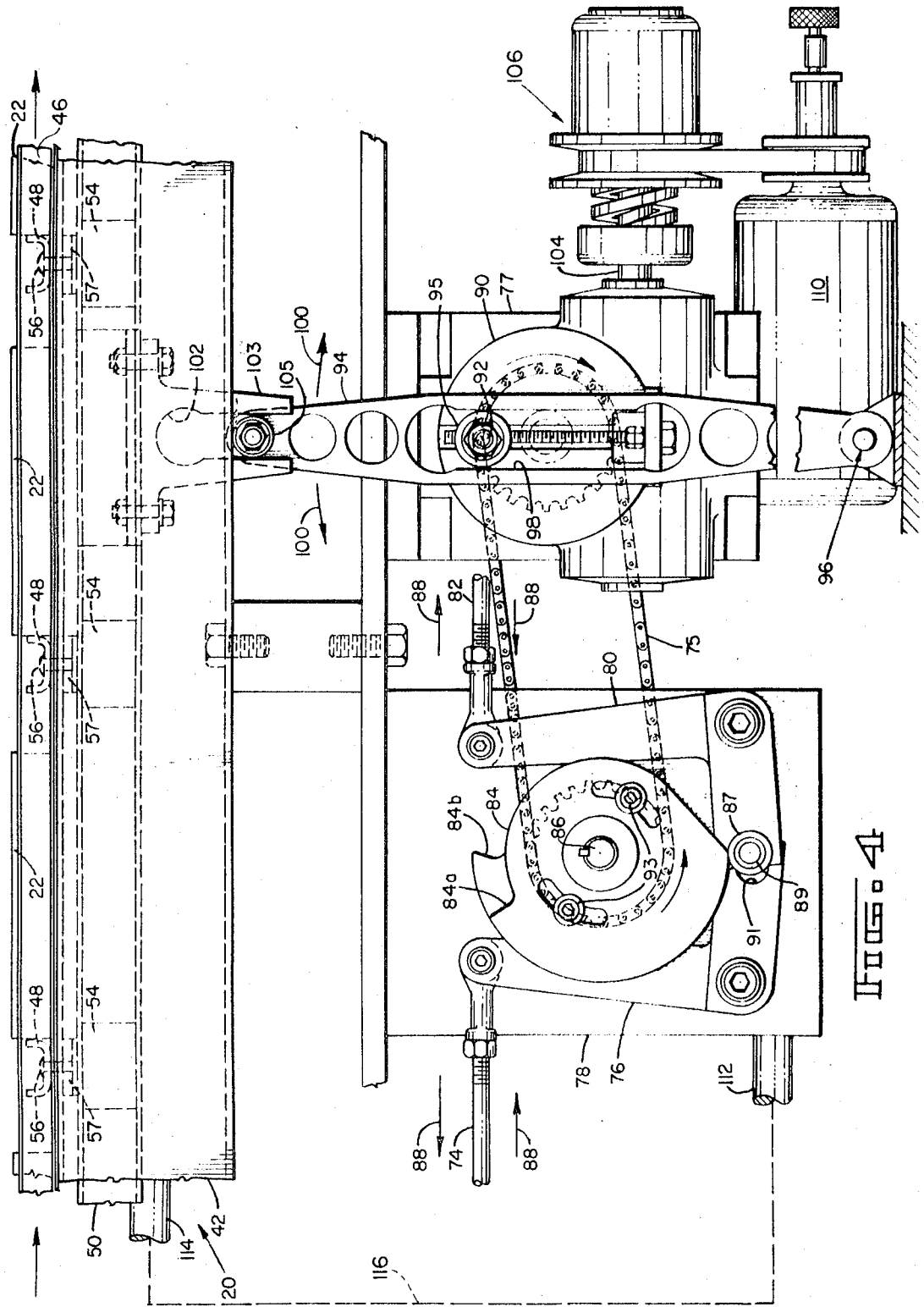
FIG. 4 is an enlarged side elevational view of the walking beam conveyor showing the mechanism for intermittently feeding boxes or trays therealong.
Figure 5:
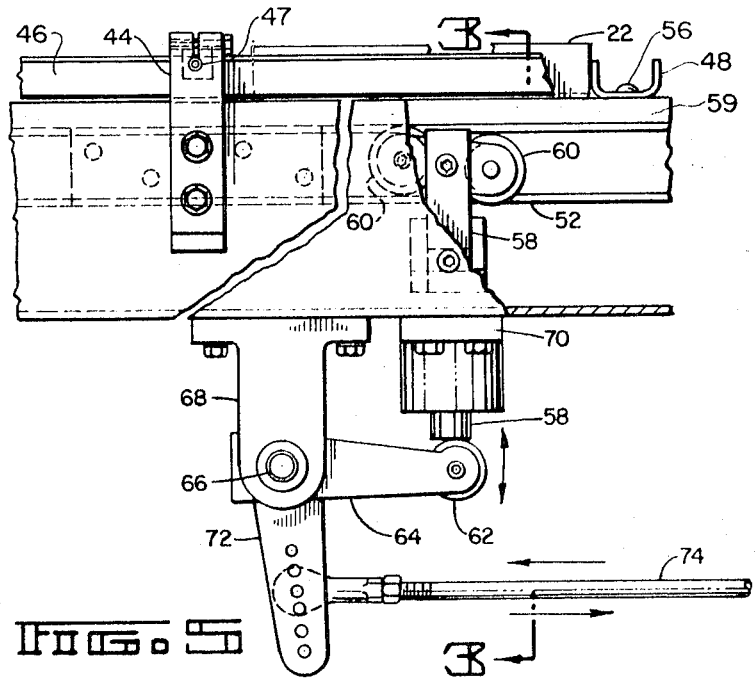
FIG. 5 is a side elevational view of the opposite end of one of the push rods shown in FIG. 4, together with the mechanism for vertically reciprocating the pushers.

Turning now to a more detailed description of the box conveyor 20, FIGS. 3 and 4 show the conveyor 20 as comprising a fixed framework which includes an upwardly facing box-engaging surface 40 provided by two laterally spaced plates 41, 41 and longitudinally extending channels 42, 42 therebelow for supporting the plates. The channels 42, 42 are supported by suitable parts of the framework as shown in FIG. 2, and carry upright posts, one of which is indicated at 44 in FIG. 3, spaced longitudinally along their length, a number of such posts being carried by each channel member. These posts are used to support two guide rails 46, 46 which are connected with the posts by supporting members 47, 47 having cylindrical shanks received in conforming openings in the posts to allow lateral adjustment of the guide rails to vary the spacing therebetween to accommodate differently sized boxes.

Means is also included in the conveyor for pushing the boxes 22, 22 in an intermittent fashion longitudinally therealong. This means includes a plurality of box-engaging pushers 48, 48, as best shown in FIG. 3 and FIG. 4, fixed relative to one another and carried by a longitudinally extending beam 50. The beam 50 is made up of two channel-shaped members 52, 52 arranged back-to-back and spaced apart laterally by a spacer 54 of hollow rectangular cross section. Attached to the top of the spacer 54, as by welding or riveting, and extending along the full length of the beam is a channel member 59 having an upwardly open slot extending along its length. The various pushers 48, 48 are adjustably attached to the channel member 59 by screws 56, 56 each of which passes through a respective one of the pushers and is threaded into an associated nut 57 slidably received in, and held captive by, the channel member. Therefore by loosening its screw 56 any one of the pushers may be moved to different positions along the length of the beam to vary the spacing between the pushers and to thereby adapt the conveyor to use with different size boxes.

The box conveyor further includes a means for repeatedly and in sequence extending the pushers 48, 48 above the box-engaging surface 40 of the conveyor, for moving said pushers through a predetermined linear displacement along the conveyor, and for then retracting said pushers below the surface 40 and returning them to their initial positions. Preferably, this means includes a pair of vertically reciprocable yokes, one of which is shown at 58 in FIGS. 3 and 5, located at spaced points along the length of the conveyor. Each yoke 58 has an upwardly extending bifurcated end portion, each bifurcation of which carries a pair of rollers 60, 60. The two rollers of each pair are preferably arranged, as viewed in FIG. 5, on either side of the yoke member 58 and are slightly offset vertically from one another so that one engages the upwardly facing inner surface of the associated channel member 52 and the other engages the downwardly facing inner surface of the same channel member. As so constructed, the beam 50 is free to move longitudinally relative to the yokes, while at the same time being restrained to move vertically therewith. The lower end of each yoke 58 is engageable by a follower roller 62 rotatably carried at the free end of a crank arm 64. The crank arm 64 is fixed to a rocker shaft 66. As best shown in FIG. 3, each rocker shaft 66 has its respective end portions journalled in depending brackets 68, 68.

A bearing block 70 slidably supports the cylindrical lower end portion of the yoke 58 so as to restrict the same to vertical movement. A depending crank arm 72 is fixed to the rocker shaft 66 and has one end of a push rod 74 pivotally connected thereto. It will be apparent from FIG. 5 that reciprocatory motion of the push rod 74 is effective to raise and lower the yoke 58 and to thereby vertically extend and retract the box-engaging pushers 48, 48.

Still with reference to FIG. 4, the push rod 74 is connected at its opposite end to the upright arm of a bell crank 76, which bell crank is in turn pivotally supported on the fixed housing of a barrel cam unit 78. A similarly shaped righthand bell crank 80 is also pivotally mounted on the opposite side of the cam unit housing 78 and a second push rod 82 is connected to its upright arm for operation of a second yoke (not shown) at the opposite end of the beam 50, which second yoke is constructed and operates in a similar manner to the one described above. A rotary cam 84 is carried by a shaft 86 of the barrel cam unit 78. This cam 84 controls the movement of a cam follower 87 carried by one arm of the right-hand bell crank 80. The cam follower 87 includes a shaft 89, fixed to the crank 80, which extends into a slot 91 in the crank 76 to drivingly connect the two cranks. From FIG. 4 it will therefore be apparent that rotation of the cam 84 causes reciprocatory motion, in the direction of the arrows 88, 88 of both of the push rods 74 and 82 so as to effect vertical movement of the two associated yokes, the beam 50, and the box-engaging pushers 48, 48 in the manner just described. It should also be noted that the cam 84 is made up of two plates 84a and 84b. The plate 84a is fixed to the shaft 86 and the plate 84b is adjustably fixed to the plate 84a by two screws 93, 93 received in arcuate slots in the plate 84b. Therefore by adjusting the plate 84b relative to the plate 84a the point at which the pusher members rise above the surface 40 during each cycle of the conveyor may be varied. The fall portion of the cam is, however, in the fixed cam plate 84a and therefore the pusher members are always retracted at the same point in each cycle. Also, it should be noted that the fall portion of the cam is very steep. Therefore, when this portion of the cam reaches the follower 87 the follower suddenly moves inwardly toward the shaft 86 and causes the pusher members to be suddenly retracted. It will, of course, also be further understood that during the time the pusher members are raised and moved forwardly they push the associated boxes 22, 22 forwardly, the boxes being advanced one step during each cycle of the conveyor. Due to the sudden retraction of the pusher members provided by the cam 84 the boxes are accordingly accurately located on the conveyor at the end of each period of forward box movement. In the case illustrated in FIG. 1 there are five boxes located between the two loading stations shown and the conveyor therefore undergoes six cycles of movement in moving a particular box from one station to the other. The number of cycles required may, however, be varied to suit different size boxes or different configurations of the apparatus components without departing from the invention. In any event, the action of the conveyor is such as to accurately locate each box brought to a loading station 35 with the associated transfer mechanism 37.

A speed reducing unit 77 is fixed to the framework of the machine alongside of the barrel cam unit 78, as shown in FIG. 4. A crank 90 is mounted on the output shaft (not shown) of the unit 77 and carries an eccentrically mounted stud 92, provided with a roller 95, which is radially adjustable to vary its radial displacement from the axis of said shaft. A generally vertically arranged lever 94 is pivotally supported by the framework of the conveyor, as indicated generally at 96, and includes an elongated slot 98 in which the stud 92 and its roller 95 are received so that rotation of the crank 90 causes the lever 94 to oscillate back and forth in the direction of the arrows 100, 100. The free, or upper end, of the lever 94 is received in a suitable vertically elongated slot or socket 102 provided in a depending block 103 fixed to the beam 50. A stud fixed to the upper end of the lever 94 carries a roller 105 for engagement with the walls of the slot 102. It will thus be apparent that rotation of the crank 90 causes longitudinal reciprocatory movement of the beam 50 as a result of the driving action of the lever 94 working on the block 103, as well as vertical movement of said beam and its associated box-engaging pushers 48, 48 as hereinbefore described. It will also be apparent that by adjusting the radial displacement or eccentricity of the stud 92 and roller 95 the amplitude of the reciprocatory movement of the beam 50 may be readily varied.

Still with reference to FIG. 4, the speed reducing unit 77 has an input shaft 104 which is drivingly connected to an electric motor 110 through a conventional variable speed belt drive unit, indicated generally at 106. The variable speed drive 106 therefore directly drives the speed reducing unit 77. The barrel cam unit 78 is in turn driven from the output shaft of the speed reducing unit 77 by a chain 75 trained over sprockets (not shown) respectively fixed to the output shaft of the speed reducing unit and the input shaft 86 of the barrel cam unit. Varying the speed of the input shaft 104 of the speed reducing unit 77, by adjusting the variable speed drive, therefore, uniformly changes the speeds of the vertical beam motion and the longitudinal beam motion.

As shown in FIG. 4, the barrel cam unit 78 also has an output shaft 112 which through the action of its unit, is oscillated angularly back and forth about its central axis in response to rotation of the shaft 86. The barrel cam unit causes the shaft 112 to oscillate through one complete cycle of back and forth movement between limits spaced 90 degrees from one another as the shaft 86 undergoes one full revolution, with a dwell period occurring at each limit of the shaft travel. The output shaft 112 is connected by suitable means (not shown but indicated by the broken line 116), to a longitudinally extending shaft 114, located alongside of the conveyor, in such a manner that the shaft 114 is oscillated through one complete cycle of back and forth movement, between limits displaced approximately 180 degrees from one another, with dwells occurring at each limit of travel, in response to each cycle of oscillation of the shaft 112. The driven shaft 114, also shown in FIG. 1, is used in the illustrated apparatus to drive the article transfer means 37, mentioned hereinabove, for transferring articles from the chutes 36, 36 into the awaiting boxes 22, 22 in a manner which will now be described in greater detail.

Turning to FIG. 10, the article transfer means 37 of the present invention comprises an upright arm or link 120 which is angularly adjustably mounted above the driven shaft 114 and carries two sprockets at its upper end, only one of which is shown at 122. The sprocket 122 is drivingly connected to the shaft 114 through a chain 124 and still another sprocket 126 fixed to the shaft 114 as shown. The sprocket 122 is fixed to a shaft 123 rotatably supported by the arm 120. A cross arm 128 is also fixed to the shaft 123 for movement thereby between the full line and broken line positions shown in FIG. 10.

A transfer head 130 is rotatably supported at the free end of the cross arm 128 by means of a hollow shaft or tube 131. A sprocket 127 is fixed to the head 130 and is driven by a chain 129 trained thereover and also over the second sprocket (not shown) fixed to the same shaft 123 as the sprocket 122. Therefore as the shaft 114 oscillates the cross arm swings relative to the vertical arm 120 and the head 130 rotates relative to the cross arm to keep it from rotating from its true vertical orientation. The hollow shaft 131 is connected to the outlet of a valve body or block 132, shown in FIGS. 3 and 14 by a flexible line 134.

The transfer head 130 is shown in greater detail in FIGS. 15, 16 and 17, and comprises a pair of spaced end plates 302, 302 each of which is welded to the hollow shaft or tube 131. A pair of angle brackets 304, 304 are attached to the lower corners of the end plates 302, 302 so that each extends along one side of the head, and each bracket has a horizontal flange which includes an elongated slot 306, best shown in FIG. 17. A plurality of transverse bars 308, 308 are adjustably fixed to the angle brackets 304, 304 by threaded fasteners 320, 320 and each bar has an elongated slot 310 in which a pickup unit 312 is positioned, as best shown in FIG. 15. Each pickup unit 312 handles or transfers one candy during each cycle of the movement of the head and has a compliant lower skirt 314 which engages the candy and is capable of accommodating slight variations in the dimensions thereof. The upper portion 316 of each unit 312 is threaded and is capable of being adjustably positioned vertically with respect to its associated bar 308 by two lock nuts 318, 318 threadably received thereon on opposite sides of the bar 308. These nuts 318, 318 when tightened, also serve to hold each unit 312 in a particular selected position along the bar 308. The several bars 308, 308 are in turn adjustable longitudinally of the head by loosening the screws 320, 320 and sliding them along the angle brackets 304, 304, the screws 320, 302 thereafter being re-tightened to hold the bars 308, 308 in their selected positions.

From the foregoing it will therefore be obvious that each pick-up unit 312 is adjustable in three dimensions relative to the fixed structure of the head as represented by the angle brackets 304, 304 and end plates 302, 302. That is, each pick-up unit is adjustable longitudinally, transversely and vertically relative to the angle brackets 304, 304. This adjustability of the pick-up units allows them to be moved to different positions to fill different compartments of the boxes 22, 22 presented to the loading station associated with the head. The vertical adjustment of the pick-up units 312, 312 allows the units to be adjusted to accommodate different heights of candies and to compensate for changes in the height of the head brought about by angular adjustment of the arm 120.

Each of the candy pick-up units 312, 312 on each pick-up head is connected to the associated hollow shaft or tube 131 by a flexible conduit 322 so that each is in turn connected to the vacuum source in response to operation of the valve block 132. The valve block 132, best shown in FIGS. 3 and 14, is connected to a suitable vacuum source (not shown) by a conduit 138 and to the transfer head assembly, just described, by a flexible line 134. The valve block 132 controls the application of vacuum to the pick-up units 312, 312 so that candies may be picked up from the chutes 36, 36 and deposited in particular compartments of the awaiting box 22 in timed relationship with the movement of the associated cross arm 128. That is, the valve block 132 functions, in conjunction with the movements of the arm 128, to turn on the vacuum when the transfer head reaches its dwell position over the chutes 36, 36 and to maintain such vacuum until it reaches its dwell position over the awaiting box 22, at which time the vacuum is destroyed and the arm 128 returned to its initial position.

The valve block 132 comprises an elongated rectangular body having a cylindrical bore extending vertically therethrough, with the vacuum line 138 connected to its lower inlet end and the flexible line 134 connected to its upper outlet end. A butterfly type valve element 140 is pivotally supported in the bore for movement between open and closed positions in response to pivotal movement of an associated valve lever 142 carried by the shaft 114. The valve element 140 is carried on an axle which extends diametrically across the bore and which has arms 144 and 145 fixed respectively to its opposite ends. Both of said arms are located outside of the valve block 132 and the first arm 144 is arranged so as to be engaged and operated by the free end of the lever 142. A tension spring 141 biases the arm 145 toward a stop 139. When the arm 145 is in engagement with the stop 139 the valve element 140 is in an open position to provide communication between the vacuum source and the associated transfer head. Movement of the arm 144 by the lever 142 moves the valve element 140 away from its open position, against the force of the spring 141 acting on the arm 145, to a closed position at which the valve element 140 closes the bore of the valve block and closes off the vacuum source from the transfer head. To assure a positive release of the candies when the vacuum source is shut off by the closing of the valve element 140, the valve block further includes an atmospheric vent port 137, and an associated plate 143, preferably made of plastic such as Delrin or the like, is moved between open and closed positions relative to the port by the second arm 145 to which the plate is attached. The arm 145 is so positioned that the plate 143 covers the vent port 137 when the valve element 140 is in its open position and so that the plate 143 is moved to an open position relative to the vent port 137 when the valve element 140 is closed. Therefore, when the valve element is closed, the vent port 137 is open to release or dump the vacuum existing in the line 134.

It will be understood that the machine includes a number of valve blocks 132, 132 with each being associated with a respective one of the transfer assemblies 37, 37. As shown in FIGS. 1 and 3, each valve block 132 is supported on a keyway or guide 150, which extends the length of the box conveyor 20, by means of an attachment member 151 which slideably engages the keyway and is slideable therealong to different positions along the length of the conveyor. Suitable set screws or other means (not shown) are included in the attachment member 151 for releaseably fixing it in any desired position of adjustment. The keyway 150 is also shown in FIG. 10, and from that figure it will also be noted that it additionally serves as a support for the lower end of each vertical link or arm 120. The lower end of each vertical arm 120 includes an arcuate recess 121 which engages a pair of pins 152, 152 arranged generally parallel to the rocker shaft 114. A bracket 154 is slidably supported by the keyway 150, as shown, and the pins 152, 152 extend through the bracket 154 and carry roller bearings (not shown) for engaging the shaft 114 to provide a journal support for the arm 120. The shaft 114 is journaled at its end in suitable bearings (not shown) located at or near the ends of the conveyor 20. The arm 120 is angularly adjustably supported on the bracket 154 through an elongated slot 156 so that the arm 120 may be moved angularly about the axis of the shaft 114 to vary the location of the transfer head 130 during its article depositing dwell period, relative to the boxes 22, 22 brought to the associated loading station by the conveyor 20, to accommodate different size boxes. That is, by changing the angular orientation of the arm 120 about the axis of the shaft 114 the center line of the associated transfer head 130 may be moved laterally relative to the boxes brought to the associated loading station by the conveyor. Preferably, the adjustment is such that during the dwell of the transfer head over a box at the loading station the center line of the head is in approximately the same plane as the center line of the box. The pick-up units 312, 312 of the transfer head are then adjusted so that they are in vertical alignment with the compartments which are desired to be filled at such loading station. This adjustment is not, however, necessary, and in some instances it may be desirable to have the center line of the transfer head, during its article depositing dwell period, located to one side or the other of the center line of the awaiting box. As brought out hereinafter, the chutes 36, 36 are also adjustably connected with the conveyor 20 to allow their lower ends to be moved toward or away from the side of the conveyor to compensate for changes in the location of the associated transfer head 130, during its article pick-up dwell period, brought about by angular adjustment of the vertical arm 120.

The keyway-receiving end of the bracket 154 is of a split construction to allow the bracket to be moved to and fixed at different positions along the keyway and to allow the bracket, if desired, to be completely detached from the keyway. That is, the bracket 154 may be readily removed from or added to the apparatus without disassembling the shaft 114 from its position alongside the conveyor 20. The lower bracket 126 is also preferably of a split construction so as to be readily disassembled from the shaft 114.

Turning now to the description of the chutes 36, 36 FIG. 10 shows each chute 36 as being supported at its lower end by an arm 160 having a right-hand end which is received on and supported by the keyway 150 as shown for slidable adjustment along. The arm 160, as shown in FIG. 1, includes a number of laterally extending slots 161, 161 each associated with a respective one of the chutes 36, 36. Each slot in turn receives an upstanding post 162 which is movable to different positions along the length of the slot and which may be fixed at any selected position by tightening a bolt on its lower end. The upper end of each post 162 is adapted to pivotally receive one end of an elongated support member 164 located below and arranged generally parallel to the associated chute 36. The opposite end of the support member 164 is connected to and is supported by the upper end of a vertical strut 166 which strut is in turn adjustably mounted to the edge of a circular plate comprising the upper portion of an associated pedestal 42 as shown. More particularly, a bifurcated block 167 is welded to the lower end of the strut 166 and its bifurcations extend radially inwardly on either side of the circular plate so that a screw 169, threaded into one of the bifurcations, may be used to releasably clamp the chute supporting structure in any convenient angular relation relative to the pedestal. As pointed out hereinafter, the bowl 28 is adjustable angularly about a vertical axis relative to the pedestal and tray 26, and the adjustability of the vertical strut 166 relative to the pedestal allows the upper end of the associated chute to be brought into proper relationship with the gate of the bowl when the bowl is rotated to a new position relative to the pedestal. Such adjustment of the bowl relative to the pedestal is often required when the pedestal is moved to a new position relative to the conveyor to adapt the machine to packing a different type of box.

Figures 6, 7:
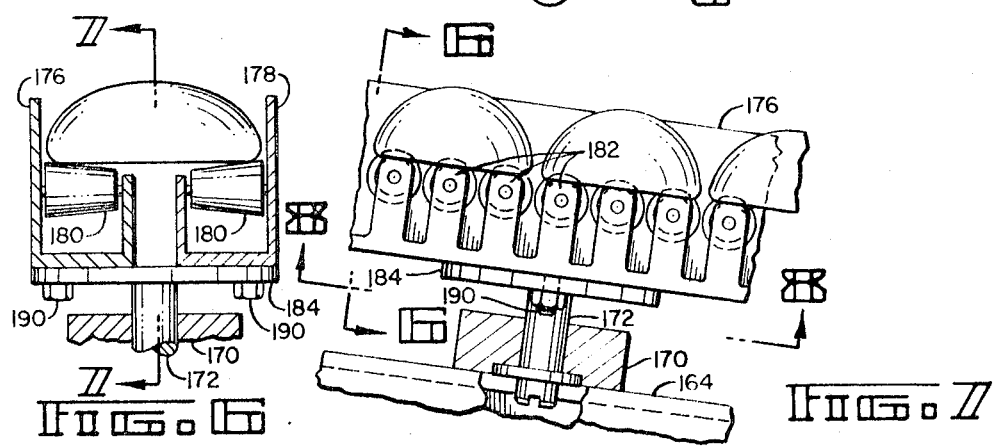
FIG. 6 is a vertical section through one of the chutes shown in FIG. 1, and is taken along the line 6—6 of FIG. 7.
Figure 8:
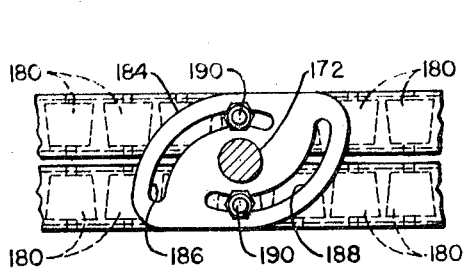
FIG. 8 is a sectional view taken along the line 8—8 of FIG. 7.
Figure 9:
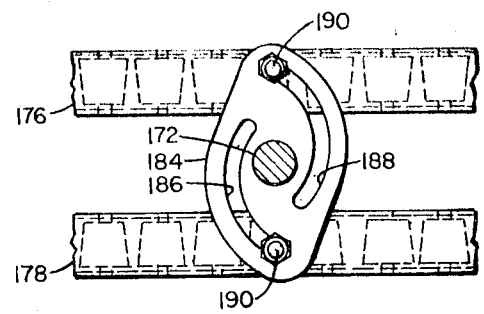
FIG. 9 is similar to FIG. 8 but shows the two side portions of one chute spread to accommodate articles of relatively large size.

A pair of longitudinally spaced bushings 170, 170 are provided on each support member 164, and each bushing 170 receives a depending post 172 which can be rotated therein to adjust the lateral width of the chute to accommodate the particular candies handled thereby. Each depending post 172 includes a slotted lower end portion, best shown in FIG. 7, which can be rotated from beneath the support member 164 through the use of a conventional screwdriver or the like. The chute 36 comprises a pair of channel-shaped members 176 and 178, best shown in FIG. 6, arranged in back-to-back relation and each having an outside leg or flange longer than its associated inside leg or flange. The two legs of each channel-shaped member rotatably support a plurality of tapered rollers 180, 180 received therebetween. As best shown in FIG. 7, the inner leg of the member 176, and also of the member 178, may be made up of a plurality of upwardly extending fingers 182, 182 so that any one of the rollers 180, 180 can be readily removed by bending its associated finger and removing the pivot pin upon which the roller 180 is supported. The channel-shaped members 176 and 178 are connected to one another by two cam plates 184, 184, best shown in FIGS. 8 and 9, each attached to a respective one of the posts 172, 172. Each cam plate 184 is welded to the upper end of its post 172 and includes a pair of arcuately shaped non-concentric notches 186 and 188 each of which receives a depending screw 190 carried by an associated one of the channel members 176 or 178. Rotation of each post 172 and of the associated cam plate 184 achieves a lateral displacement of the channel members 176 and 178, as evident from FIGS. 8 and 9. Therefore, the spacing between the outer legs of the channel-shaped members 176 and 178 can be conveniently varied to accommodate candies or other articles of various sizes. Preferably, and as best shown in FIG. 6, the members 176 and 178 are adjusted to provide a slight spacing between their respective outer legs and the periphery of the candy. This spacing will be maintained as the candies are fed down the chute by gravity due to the tapered roller configuration, which tends to cause the candies to center themselves laterally of the chute.

Still with reference to the chutes 36, 36, FIG. 10 shows the illustrated chute broken away to reveal a sensitive electrical switch 192 mounted on the support member 164 with its actuating element or arm 194 extending upwardly between the channel-shaped members 176 and 178 so as to be engageable with the candies passing down the chute. The switch is preferably located on the support member 164 so that a convenient number of candies can be stored on the chute 36 below the switch. As indicated in FIG. 10a, the switch 192 is provided in an electrical circuit for energizing the actual motor 196 of the associated driving base 30. As mentioned hereinabove, batches of articles or candies to be packed in the boxes 22, 22 are first loaded on the inclined trays 26, 26. When a shaker motor is energized the articles on the associated tray are vibrated down the tray into the feeder bowl 28, and around the feeder bowl into the associated chute 36. Each candy passing down the chute trips the switch 192, but the circuit shown in FIG. 10a maintains energization of the shaker motor 196 until the switch is held closed by reason of a predetermined number of articles 24, 24 being stored in the chute. This result is achieved by using a time delay relay and a power relay in conjunction with the switch 192 and the motor 196. The time delay relay has an operating coil 198 and a pair of normally open contacts 198a. The power relay has an operating coil 199 and a pair of normally closed contacts 199a. The coil 198 of the time delay relay is connected in series with the switch 192 across a pair of power lines. The coil 199 of the power relay is connected in series across the same power lines with the contacts 198a of the time delay relay, and the motor 196 is also connected across the power lines in series with the power relay contacts 199a. The coil 198 of the time relay relay must remain energized for a predetermined amount of time before the associated contacts 198a are closed. Therefore, if the switch 192 is only closed momentarily, as by a candy passing thereover, the coil 198 is not energized for a sufficient time to close the associated contacts 198a, and the relay coil 199 remains unenergized and the motor 196 remains energized. When, however, candy is backed up in the associated chute 36 to the point where the switch 192 is maintained in a closed position for a considerable amount of time, the time delay relay operates to close the contacts 198a. This in turn energizes the power relay coil 199 and opens the associated contacts 199a to de-energize the motor 196. In this manner, the shaker motor 166 is cycled on and off as needed to maintain a substantially constant supply of candies in the chute, this preventing the possibility of the candy becoming crushed or otherwise damaged by the pressure of too many candies in the chute.

Turning now to a more detailed description of the vibratory feeder bowl 28 and its associated tray conveyor 26, FIG. 13 shows schematically the internal shaker motor 196 as acting between a relatively fixed base 200, which is shock-mounted on the pedestal 42 as shown, and the feeder bowl 28, through conventional means indicated by broken lines 202, 202. The actual means for vibrating the bowl 28 may be similar to that shown and described for example in Patent No. 2,790,534, issued to Spurlin on April 30, 1957, to which reference is made for a more complete description. The tray 26 is supported on the pedestal 42 by means including a pair of fixed blocks 204 and 206 each of which is resiliently connected, at spaced locations, to the underside of the tray 26 by two depending blocks 208 and 210, respectively. The depending block 208 is connected to the fixed block 204 by a flat leaf-type spring 212 while the depending block 210 has an offset lower portion 214 which is connected to the fixed block 206 by a similarly shaped leaf-type spring 216. The springs 212 and 216 have a width substantially greater than their thickness so as to restrict movement of the tray 26 to arcuate movement generally along its length in response to excitation of the shaker motor as hereinafter described.

The feeder bowl 28 has a generally convex upper surface bounded by the peripherally extending fence 34 as discussed hereinabove. From the sectional view of FIG. 11 and the plan view of FIG. 12, the bowl 28 can further be seen to include a ramp or stepped portion leading to the radially inwardly recessed gate which receives the upper end of the chute 36. The shaker motor 196 is effective to produce a generally arcuate vibratory motion of the bowl 28 which causes articles to be fed around the bowl in a counterclockwise direction as viewed in FIG. 12, certain of such articles therefore being fed along the ramp 218 and into the associated chute 36. The convex upper surface of the bowl 28 causes these articles to move radially outwardly while the motion imparted to the bowl by the shaker motor 196 causes them to move in the counterclockwise direction.

Suitable tooling is provided adjacent the gate of the bowl 28 for rejecting improperly oriented articles before they are fed into the associated chute. This orientation tooling may take any of a variety of configurations depending on the nature and shape of the articles being fed. The illustrated tooling has, however, been found quite satisfactory for articles of generally rectangular or square shape. In the construction illustrated, a guide 251 is located adjacent the gate of the bowl and extends for some distance rearwardly thereof generally parallel to the associated portion of the peripheral fence of the bowl, the guide 251 being spaced inwardly of the peripheral fence by a distance slightly greater than the shorter dimension of the candies. The rear or upstream portion of the guide 251 is curved inwardly toward the center of the bowl so as to provide a funnel-shaped mouth for receiving candies. Cooperating with the mouth formed by the curved rear portion of the guide 251 is a rejecting bar or guide 250. The rejecting guide 250 has a bowed shape as shown in FIG. 12, and has its upstream end attached to the peripheral fence 34 of the bowl. Associated with the guide 250 is a screw 252 which is threadably received in a bolt, welded or otherwise fixed to the peripheral fence, and which extends through the fence into engagement with the guide 250 intermediate its ends. The guide 250 is made of a spring material and is biased by its own resiliency toward the screw 252. Therefore, by rotating the screw 252 in one direction or the other, the guide 250 may be moved toward or away from the inner edge of the ramp 218. When properly adjusted, the guide 250 allows only those candies which are properly oriented to pass therebeyond into the mouth formed by the curved portion of the guide 251. Those candies which are improperly oriented have their centers of gravity located inwardly of the inner edge of the ramp 218 and by their own weight fall off of the ramp and slide down an inclined surface 220 extending from the inner edge of the ramp to the bowl floor, as best shown in FIGS. 11 and 12. The inclination of the surface 220 is sufficiently slight that the articles moving thereover do not tumble and loose their upside-up orientation. Thus, these articles are in position for a subsequent pass at the ramp 218 and the associated gate.

The bowl 28, as best seen in FIG. 13, has a central opening 222 and is attached to the shaker motor mechanism by two generally circular upper and lower plates 224 and 226. The lower plate 226 is fixed to the shaker mechanism and is oscillated about its vertical central axis when the shaker motor 196 is energized. The upper plate 224 is releasably secured to the lower plate by a screw 228, and the two plates receive and clamp therebetween the inner marginal lip 223 of the bowl. As so constructed and arranged, the angular orientation of the bowl 28 can be conveniently preset or adjusted, by rotating it relative to the plates 224 and 226, to cause its gate to be aligned with the associated chute 36 to suit various different orientations of the bowl and chute with respect to the box conveyor 20. As shown in FIG. 12, the upper and lower plates 224 and 226 are further clamped to one another by additional releasable fasteners 229, 229, and they include openings or notches 211 and 213 through which the depending blocks 208 and 210 respectively extend without interfering with the oscillating motion of the plates.

Referring now to the means for vibrating the tray 26 in response to the vibrations of the bowl 28, this means, as shown in FIGS. 12 and 13, includes a rectangularly shaped block 230 which is fixedly attached to the upper clamping plate 224. A stud 234 projects outwardly from one side of the block 230 and is adjustable to various different points along the length of such side by means of a suitable adjustment mechanism including a screw 232 projecting from the outer end of the block. Turning the screw 232 in one direction moves the stud in one direction relative to the block, and turning the screw in the other direction moves the stud in the other direction relative to the block. The side of the block from which the stud projects is oriented generally radially of the central axis of the feeder bowl and therefore movement of the stud along such side changes its radial displacement from such central axis. The fixed block 206 includes an upstanding post 236 which also passes through the notch 213 in the clamping plates 224 and 226 so as not to interfere with the vibratory movements thereof. This post 236 rotatably supports at its upper end a generally triangularly shaped anvil plate 238 having one generally straight edge in contact with the stud 234. Therefore as the block 230 and stud 234 are vibrated angularly about the central axis of the bowl, the stud drives against the associated edge of the anvil plate 238 and vibrates the latter about the axis of the post 236. A screw 240 is threadably received in the depending portion 214 of the block 210 and has one end in engagement with another outwardly facing edge of the triangularly shaped anvil plate 238. As so constructed and arranged, arcuate vibratory movements of the feeder bowl 28 are transmitted through the stud 234 and the triangular plate 238 to vibrate the screw 240, and the associated block 210 and tray 26, along its length with an amplitude determined by the radial displacement of the stud 234 from the central axis of the feeder bowl 28.

The flat springs 212 and 216 restrict the tray 26 to movement substantially along its length, and therefore the tray 26 is caused to vibrate and feed articles longitudinally therealong in response to the arcuate vibrations of the feeder bowl 28. Thus, whenever the shaker motor 196 is energized by the circuit shown in FIG. 10a, both the bowl 28 and its associated tray 26 are so vibrated as to feed articles from the tray to the bowl and around the bowl to the associated chute 36. It should be noted also that the tray supporting springs 212 and 216 also are so arranged that they bias the screw 240 into engagement with the anvil, and this in turn biases the anvil toward the stud 234, so that the parts of the motion transmitting mechanism are kept in engagement with one another.

The invention claimed is:

1. An apparatus for placing groups of articles in a predetermined pattern onto receivers therefor, said apparatus comprising a walking beam conveyor for feeding a plurality of receivers intermittently along a generally straight horizontal path, said conveyor including means providing an upwardly facing surface for supporting said receivers and along which said receivers are slidable in moving along said path, a walking beam extending along said path and having a plurality of pushers thereon spaced along its length and means for moving said walking beam back and forth along said path and toward and away from said receivers in such a manner that said beam and pushers undergo repeated cycles of motion during each of which cycles said pushers first move forwardly in the path of said receivers to push said receivers forwardly, then move out of the path of said receivers, thereafter move rearwardly, and then move back into the path of said receivers to begin a new cycle and to advance said receivers another step during the next forward movement thereof, means for feeding articles to a loading station located alongside of said path and to which said receivers are brought in succession by said pushers, article transfer means for transferring articles from said loading station to said receivers brought thereto, and a single means for driving both said conveyor and said transfer means so that both are mechanically interlocked and move in unison.

2. An apparatus as defined in claim 1 further characterized by said single means for driving both said conveyor and said transfer means including a shaft extending along said path and supported for rotation about its longitudinal axis, means for rotating said shaft through one cycle of movement in response to one cycle of movement of said beam and pushers, and means connected with said shaft for driving said transfer means in response to said shaft movement.

3. An apparatus as defined in claim 1 further characterized by said single means for driving both said conveyor and said transfer means including a shaft extending along said path and supported for rotation about its longitudinal axis and means for rotating said shaft through one cycle of back and forth movement in response to one cycle of movement of said beam and pushers, said transfer means including an arm movable between a first position at which articles are picked up from said loading station and a second position at which articles are deposited onto the receiver brought to said loading station by said conveyor, and means connected with said shaft for driving said arm through one complete cycle of movement back and forth between said first and second positions in response to one complete cycle of said shaft movement.

4. An apparatus for placing groups of articles in a predetermined pattern onto receivers therefor, said apparatus comprising a conveyor for feeding a plurality of receivers in a step-by-step fashion along a generally straight horizontal path, means for feeding articles to a loading station located alongside of said path and to which receivers are brought in succession by said conveyor, article transfer means for transferring articles from said loading station to said receivers brought thereto, and a single means for driving both said conveyor and said article transfer means so that both are mechaniaclly interlocked and move in unison, said single drive means including a shaft extending along said path and supported for rotation about its longitudinal axis, means for rotating said shaft through one complete cycle of movement in response to movement of said conveyor through one complete cycle of its movement, means connected with said shaft for driving said transfer means in response to said shaft movement said means for rotating said shaft being operable to rotate said shaft through one complete cycle of back and forth movement in response to movement of said conveyor through one complete cycle of its movement, and said transfer means including an arm movable through substantially 180 degrees between a first generally horizontal position at which articles are picked up from said loading station and a second generally horizontal position at which articles are deposited onto a receiver brought to said loading station by said conveyor, and chain and sprocket means connected with said shaft for driving said arm through one complete cycle of movement back and forth between said first and second positions in response to one complete cycle of said shaft movement.

5. An apparatus as defined in claim 4 further characterized by said transfer means including a transfer head carried by said movable arm and having at least one vacuum pick-up thereon for picking up an article from said loading station during each cycle of movement of said arm, a valve for controlling the application of a vacuum to said head, and means on said shaft for operating said valve in timed relation to the movement of said shaft.

6. An apparatus as defined in claim 5 further characterized by said transfer means including a generally vertical arm extending upwardly from said shaft, means supporting the lower end of said vertical arm for adjustable movement of said latter arm to various different positions about the axis of said shaft, and means pivotally connecting said movable arm to the upper end of said vertical arm for movement about an axis parallel to said longitudinal axis of said shaft between said first and second positions.

7. An apparatus as defined in claim 6 further characterized by said chain and sprocket means for driving said movable arm including a first sprocket fixed to said shaft, a second sprocket fixed to said movable arm and coaxial with said pivot axis between said vertical and movable arms, and a chain trained over said first and second sprockets.

8. An apparatus as defined in claim 7 further characterized by means pivotally connecting said transfer head to the free end of said movable arm, a third sprocket fixed to the upper end of said vertical arm and coaxial with said pivot axis between said vertical and movable arms, a fourth sprocket fixed to said transfer head and coaxial with the pivot axis of said transfer head relative to said movable arm, and a chain trained over said third and fourth sprockets so as to move said transfer head relative to said movable arm in response to movements of said movable arm relative to said vertical arm to maintain said transfer head in a substantially constant orientation relative to a vertical plane despite the movement of said movable arm.

9. An apparatus as defined in claim 8 further characterized by said transfer head including a supporting structure connected with said movable arm, a part carried by said supporting structure and movable in one horizontal direction to different positions of adjustment relative to said supporting structure, and means connecting said pickup to said latter part, said latter means being so constructed as to permit said pickup to be moved relative to said part in a second horizontal direction perpendicular to said first direction to different positions of adjustment and to permit said pickup to be moved vertically relative to said part to different positions of vertical adjustment.

10. An apparatus as defined in claim 4 further characterized by said transfer means including a transfer head carried by said movable arm and having at least one pickup thereon for picking up an article from said loading station during each cycle of movement of said arm, said transfer head including a supporting structure connected with said movable arm, and means for adjustably attaching said pickup to said supporting structure so as to permit said pickup to be adjustably moved in any one of three directions relative to said supporting structure.

11. An apparatus as defined in claim 4 further characterized by means defining a keyway extending along said path, and means for attaching said article feeding means and said article transfer means to said keyway so as to be supported at least in part thereby and movable therealong to different positions along said path.

12. An apparatus as defined in claim 5 further characteirzed by said valve including a hollow housing having inlet and outlet ports, a butterfly valve element in said housing between said ports and movable between an open position at which said two ports are in communication with one another and a closed position at which said two ports are out of communication with one another, said housing also having a third port intermediate said valve element and said outlet port, a shaft fixed to said valve element and pivotally supported by said housing, a lever fixed to said latter shaft and comprising part of said means for operating said valve, and another lever fixed to said latter shaft and having a part thereon which is moved by said lever between open and closed positions relative to said third port in response to movement of said valve element between its closed and open positions respectively.

13. An apparatus as defined in claim 4 further characterized by said means for feeding articles to said loading station comprising at least one feeder bowl having a peripheral gate, means for vibrating said bowl about its center axis so as to cause articles thereon to move toward said gate, a chute for receiving articles from said gate and for carrying said articles single file to said loading station, and control means responsive to the presence of a predetermined number of articles in said chute for operating said vibrating means intermittently as required to maintain said predetermined number of articles in said chute.

14. An apparatus as defined in claim 13 further characterized by said means for feeding articles to said loading station further including a vibratory tray for feeding articles therefrom into said bowl, and driving means between said bowl and said tray for vibrating said tray along its longitudinal axis in response to vibration of said bowl about its center axis.

15. An apparatus as defined in claim 14 further characterized by said means for vibrating said bowl including a stationary base carrying a motor for vibrating said bowl, resilient means for mounting said tray in an inclined position above its associated bowl, and said means for vibrating said tray including means defining a generally vertical abutment surface fixed relative to said bowl so as to move arcuately with said bowl as said bowl vibrates, an anvil supported for pivotal movement about a vertical axis fixed relative to said stationary base and having a first portion in engagement with said abutment surface, and means defining a depending abutment surface on said tray perpendicular to the desired direction of movement of articles placed thereon, said anvil having a second portion in engagement with said depending abutment surface and said resilient tray mounting means serving to hold said abutment surfaces in contact with said respective anvil portions so that arcuate movements of said bowl are transmitted to said inclined tray and converted to linear vibratory movements of said tray so as to feed articles on said tray toward said bowl.

16. An apparatus as defined in claim 15 further characterized by said generally vertical abutment surface fixed relative to said bowl being formed by a stud, and means for adjustably positioning said stud at various different positions along a line extending generally radially of said bowl to vary the amount of movement of said anvil and of said tray effected by a given arcuate movement of said bowl.

17. An apparatus as defined in claim 15 further characterized by said resilient tray mounting means comprising at least one pair of flat springs, said springs being so arranged that said tray is restricted to vibrate generally along its length.

18. An apparatus as defined in claim 15 further characterized by said feeder bowl being generally circular and having a convex upper surface for receiving articles and a peripheral fence toward which said articles move as said bowl vibrates, said gate being defined in said peripheral fence, and means fixed to said bowl adjacent said gate for preventing improperly oriented articles from entering said chute and for causing such improperly oriented articles to move toward the center of said bowl for a subsequent pass at said gate.

19. An apparatus as defined in claim 18 further characterized by said bowl having a center opening surrounded by an inner marginal lip, and said bowl vibrating means including a bowl clamping means drivingly connected to said motor and clampingly engaging said lip so as to releasably hold said bowl in any desired angular relation to said stationary base.

20. An apparatus as defined in claim 19 further characterized by said stud providing said vertical abutment surface and said means for adjustably positioning said stud being fixed to said bowl clamping means.

21. An apparatus as defined in claim 4 further characterized by said conveyor including a fixed framework, a member extending along said path and having a plurality of pushers connected thereto at spaced points along its length, support means slidably supporting said member for movement longitudinally of said path, means supporting said support means for slidable movement vertically of said framework, means including a continuously driven rotary cam for raising and lowering said support means, a lever pivotally connected with said fixed framework and drivingly connected with said member for moving said member longitudinally back and forth in response to oscillation of said lever, and a continuously driven rotary crank drivingly connected to said cam so as to move in unison therewith for oscillating said lever.

22. An apparatus as defined in claim 21 further characterized by means for adjustably connecting said pushers to said member so as to allow said pushers to be moved to different positions of adjustment along the length thereof.

23. An apparatus as defined in claim 21 further characterized by said cam including means for varying the effective shape thereof to vary the timing of the raising and lowering of the said support means, and said crank including means for adjustably varying the amplitude of the movement of said lever effected by said crank so as to vary the amplitude of the longitudinal movement of said member.

24. An apparatus as defined in claim 13 further characterized by said chute comprising a pair of elongated side wall members, means for supporting said side wall members in laterally spaced relation and for permitting said side wall members to be adjusted toward and away from one another to vary the spacing therebetween to accommodate articles of various different sizes, and a plurality of rollers rotatably carried by each of said members for supporting articles in said chute, said chute being inclined so that the articles therein are gravity-fed toward the associated loading station.

25. An apparatus as defined in claim 24 further characterized by said side wall members being generally U-shaped in cross-section with each having a vertical outer leg poriton and a vertical inner leg portion which inner leg portion is somewhat shorter than the associated outer leg portion, said rollers being rotatably supported between said two leg portions of each side wall member.

26. An apparatus as defined in claim 25 further characterized by said rollers being tapered with the smaller end of each roller being located toward the center of said chute so as to provide a generally concave floor for said chute which causes said articles to remtain in a generally centered condition relative to said chute as they pass therealong.

References Cited
UNITED STATES PATENTS

| | | | |
|---|---|---|---|
| 2,886,927 | 5/1959 | Fisk | 53—26 |
| 2,976,659 | 3/1961 | Flanagan et al. | 53—237 |
| 3,191,357 | 6/1965 | Hawley et al. | 53—240 |
| 3,283,471 | 11/1966 | Thurston et al. | 53—160 |

THERON E. CONDON, Primary Examiner

R. L. SPRUILL, Assistant Examiner

U.S. Cl. X.R.

53—160, 240, 246, 251; 193—35; 198—219, 220; 251—305